United States Patent

Ludlow

[11] Patent Number: 5,314,242
[45] Date of Patent: May 24, 1994

[54] CASSETTE CAROUSEL APPARATUS

[76] Inventor: Jonny W. Ludlow, 44916 18th St. W., Lancaster, Calif. 93534

[21] Appl. No.: 17,602

[22] Filed: Feb. 16, 1993

[51] Int. Cl.⁵ ............................................. A47F 1/06
[52] U.S. Cl. ................................ 312/9.45; 312/223.5; 312/297; 312/305; 362/154
[58] Field of Search .............. 312/9.45, 9.46, 9.9, 312/223.5, 268, 297, 305; 362/154, 155; 206/387

[56] References Cited

U.S. PATENT DOCUMENTS

| | | | |
|---|---|---|---|
| 2,688,527 | 9/1954 | Wright | 312/297 X |
| 2,729,531 | 1/1956 | Andersen | 312/297 X |
| 3,484,573 | 12/1969 | Tingley | 312/297 X |

FOREIGN PATENT DOCUMENTS

| | | | |
|---|---|---|---|
| 761788 | 3/1934 | France | 312/9.45 |
| 641338 | 2/1984 | Switzerland | 312/9.45 |
| 340832 | 1/1931 | United Kingdom | 312/223.5 |

Primary Examiner—Brian K. Green
Attorney, Agent, or Firm—Leon Gilden

[57] ABSTRACT

A housing rotatably mounts an elongate conveyor belt, the conveyor belt having a continuous array of cassette holders, wherein access to the cassette holders is effected by displacement of a door slide mounted through a top wall opening of the top wall of the housing.

1 Claim, 4 Drawing Sheets

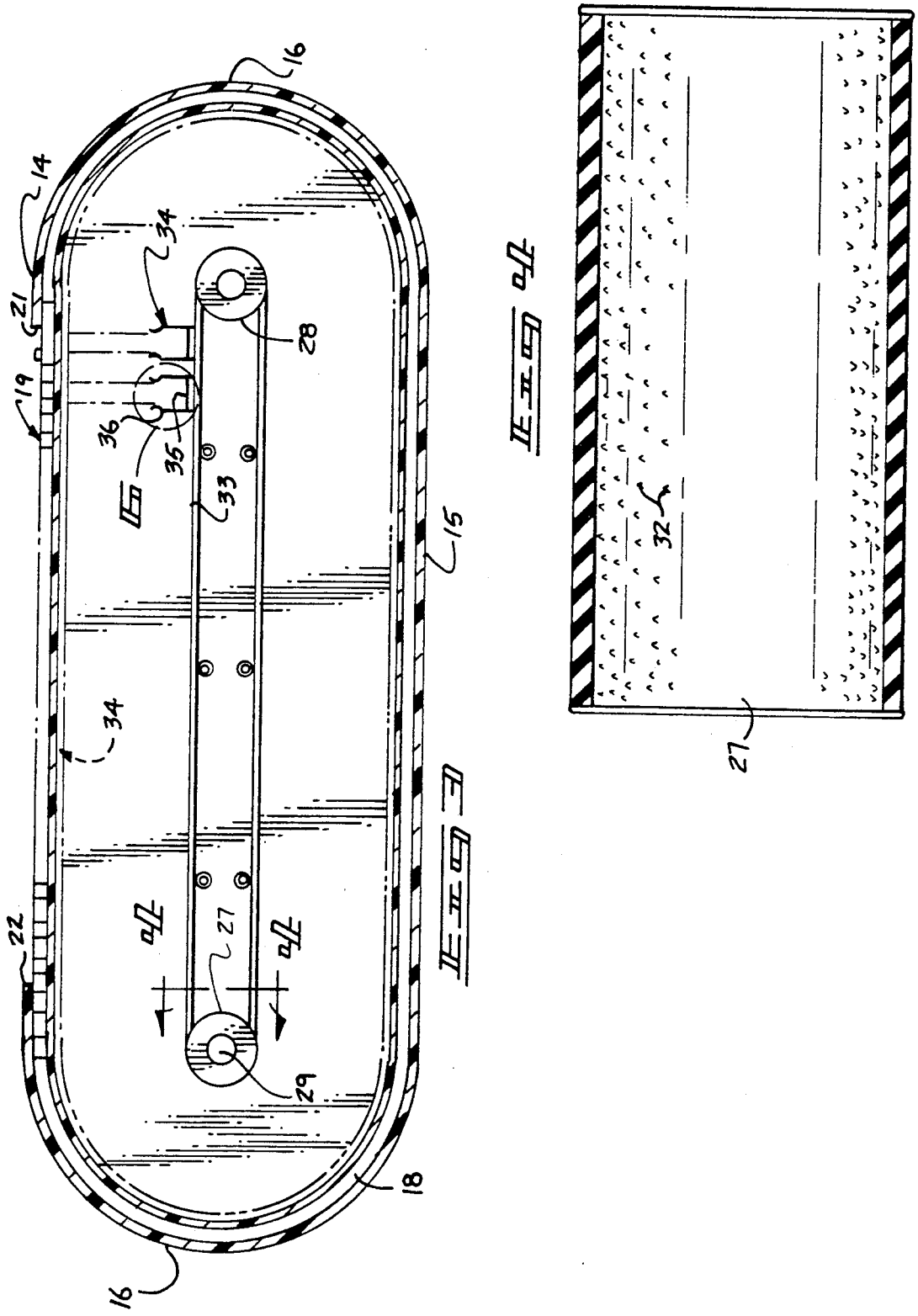

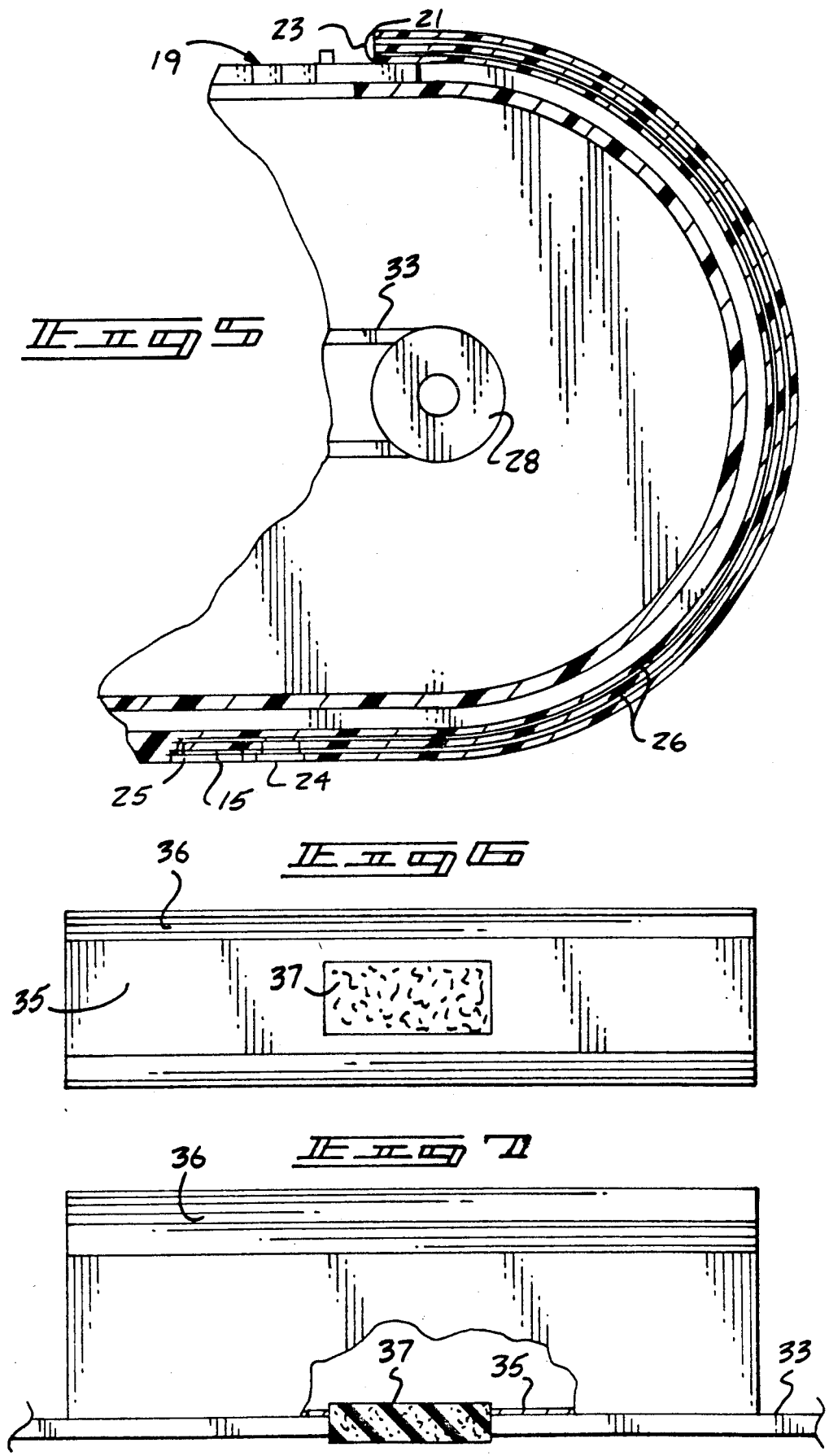

CASSETTE CAROUSEL APPARATUS

BACKGROUND OF THE INVENTION

1. Field of the Invention

The field of invention relates to cassette storage apparatus, and more particularly pertains to a new and improved cassette carousel apparatus wherein the same is arranged for the rotative mounting of cassette holders about a continuous conveyor belt.

2. Description of the Prior Art

Cassette storage structure of various types have been utilized throughout the prior art, wherein such structure is exemplified by the U.S. Pat. Nos. 5,019,927; 4,757,896; and 5,038,932.

The instant invention attempts to overcome shortcomings of the prior art by providing for cassette holders arranged in a continuous array rotatably mounted for ease of access through an opening relative to a support housing and in this respect, the present invention substantially fulfills this need.

SUMMARY OF THE INVENTION

In view of the foregoing disadvantages inherent in the known types of cassette storage apparatus now present in the prior art, the present invention provides a cassette carousel apparatus wherein the same is arranged for the rotatively oriented mounting of a continuous array of cassette holders about a conveyor belt. As such, the general purpose of the present invention, which will be described subsequently in greater detail, is to provide a new and improved cassette carousel apparatus which has all the advantages of the prior art cassette storage apparatus and none of the disadvantages.

To attain this, the present invention provides a housing rotatably mounting an elongate conveyor belt, the conveyor belt having a continuous array of cassette holders, wherein access to the cassette holders is effected by displacement of a door slide mounted through a top wall opening of the top wall of the housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is another object of the present invention to provide a new and improved cassette carousel apparatus which may be easily and efficiently manufactured and marketed.

It is a further object of the present invention to provide a new and improved cassette carousel apparatus which is of a durable and reliable construction.

An even further object of the present invention is to provide a new and improved cassette carousel apparatus which is susceptible of a low cost of manufacture with regard to both materials and labor, and which accordingly is then susceptible of low prices of sale to the consuming public, thereby making such cassette carousel apparatus economically available to the buying public.

Still yet another object of the present invention is to provide a new and improved cassette carousel apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view, taken along the lines 3—3 of FIG. 1 in the direction indicated by the arrows.

FIG. 4 is an orthographic view, taken along the lines 4—4 of FIG. 3 in the direction indicated by the arrows.

FIG. 5 is an enlarged partial view of the structure indicating the use of illumination means relative to the housing of the invention.

FIG. 6 is an orthographic view of a bottom illustration of a cassette holder, as indicated in section 6 as set forth in FIG. 3.

FIG. 7 is an orthographic side view, partially in section, of the cassette holder structure.

DESCRIPTION OF THE PREFERRED EMBODIMENT

Figure 1:
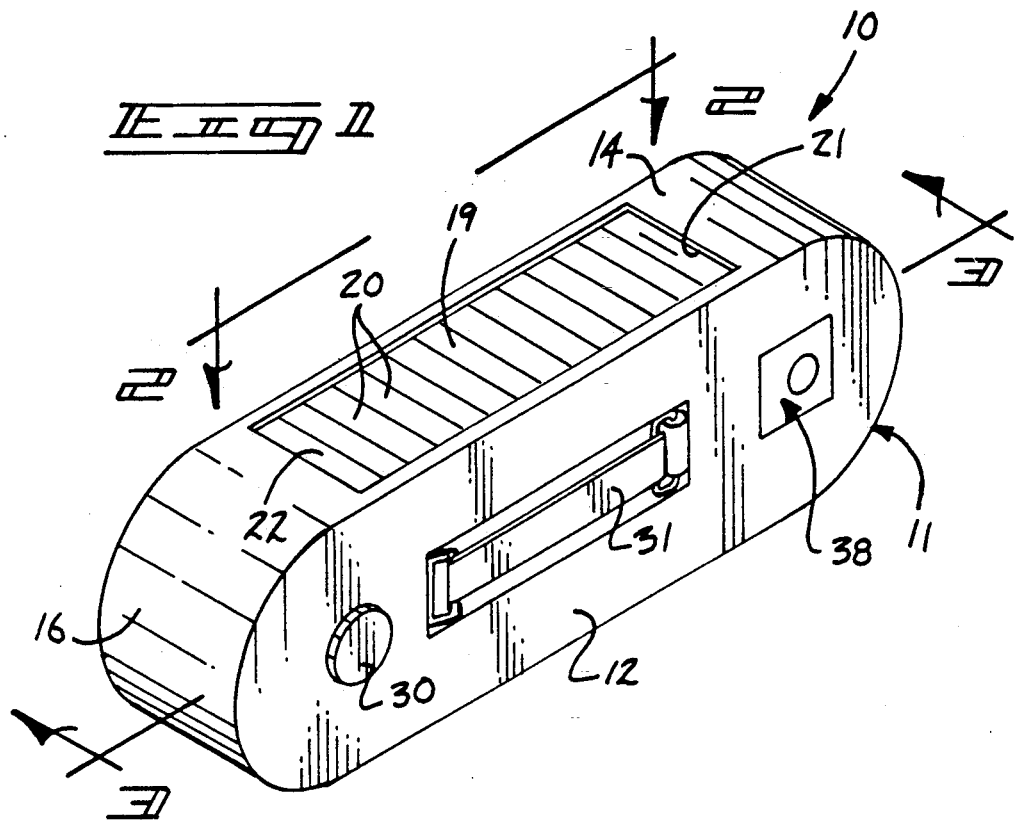
FIG. 1 is an isometric illustration of the invention.
Figure 2:
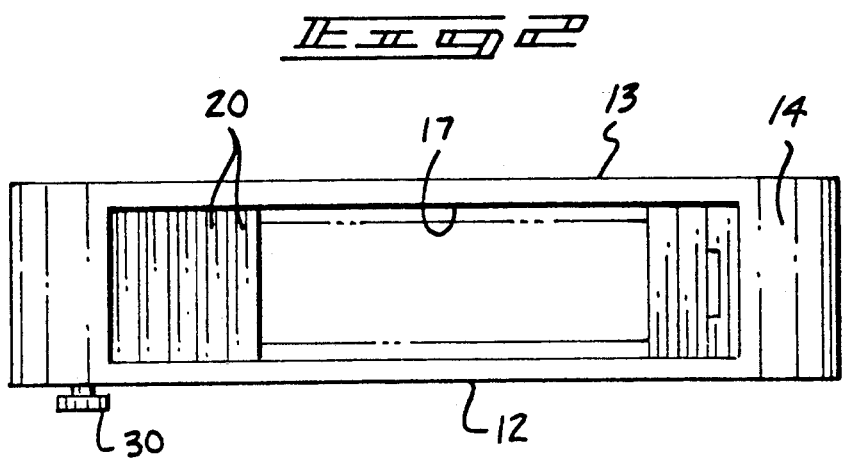
FIG. 2 is an orthographic view, taken along the lines 2—2 of FIG. 1 in the direction indicated by the arrows.
Figure 8:
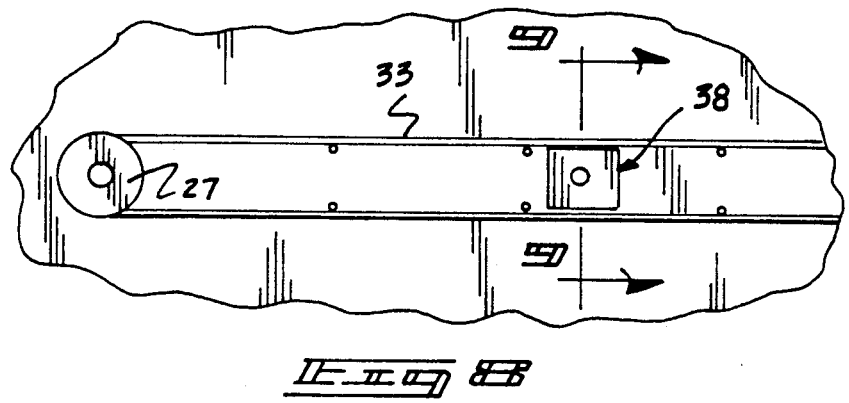
FIG. 8 is an orthographic view of the conveyor belt mounting a reservoir therebetween the flights of the conveyor.

With reference now to the drawings, and in particular to FIGS. 1 to 9 thereof, a new and improved cassette carousel apparatus embodying the principles and concepts of the present invention and generally designated by the reference numeral 10 will be described.

More specifically, the cassette carousel apparatus 10 of the instant invention essentially comprises a housing 11 having a first end wall 12 spaced from, parallel to, and coextensive with a second end wall 13. A top wall 14 is spaced from and parallel in a coextensive relationship to a bottom wall 15, with the hosing further including spaced end walls 16 to accommodate the conveyor structure therewithin, and to further accommodate the door slide structure 19 of the invention. To this end, the top wall includes a top wall opening 17, having a guide track 18 extending along the top wall and through at least one of the side walls 16 to receive the door slide 19 formed of adjacent, parallel, and pivoted door slats 20 permitting the door slats to be received within the guide track arcuate side wall structure 16.

The top wall opening includes a first end 21 spaced from a second end 22. An illumination bulb member 23, as indicated in FIG. 5, is optionally mounted coextensively with the first end 21 and in electrical communication with a battery 24 and a switch 25 mounted to the bottom wall 15 through electrical conduit wires 26 to provide for illumination through the top wall opening upon displacement of the door slide 19 for viewing of the cassettes, and more specifically the cassette holders 34, to be described in more detail below.

Spaced and parallel first and second rollers 27 and 28 are mounted rotatably between the first and second end walls 12 and 13, with the first roller having a first roller axle 29 projecting through the first end wall 12 terminating in an axle handle 30 to permit rotation of the first roller 27. An endless conveyor belt 33 mounted about the first and second rollers 27 and 28 is assisted in securement thereto by a matrix of projections 32 mounted to the exterior surfaces of each of the first and second rollers 27 and 28, whereupon rotation of the axle handle 30 provides for rotation of the conveyor belt 33. The conveyor belt 33 accordingly has mounted thereto a continuous array of cassette holders 34. For purposes of illustration, a plurality of such holders are indicated, but it should be understood, as indicated in phantom, that the cassette holders are in a continuous array in surrounding relationship to the conveyor belt 33. Each holder 34 includes a holder base 35 fixedly mounted to the conveyor belt 33, with the holder base having projecting therefrom spring-biased side walls 36 to secure a cassette therebetween, in a manner as indicated in phantom in FIG. 3.

Figure 9:
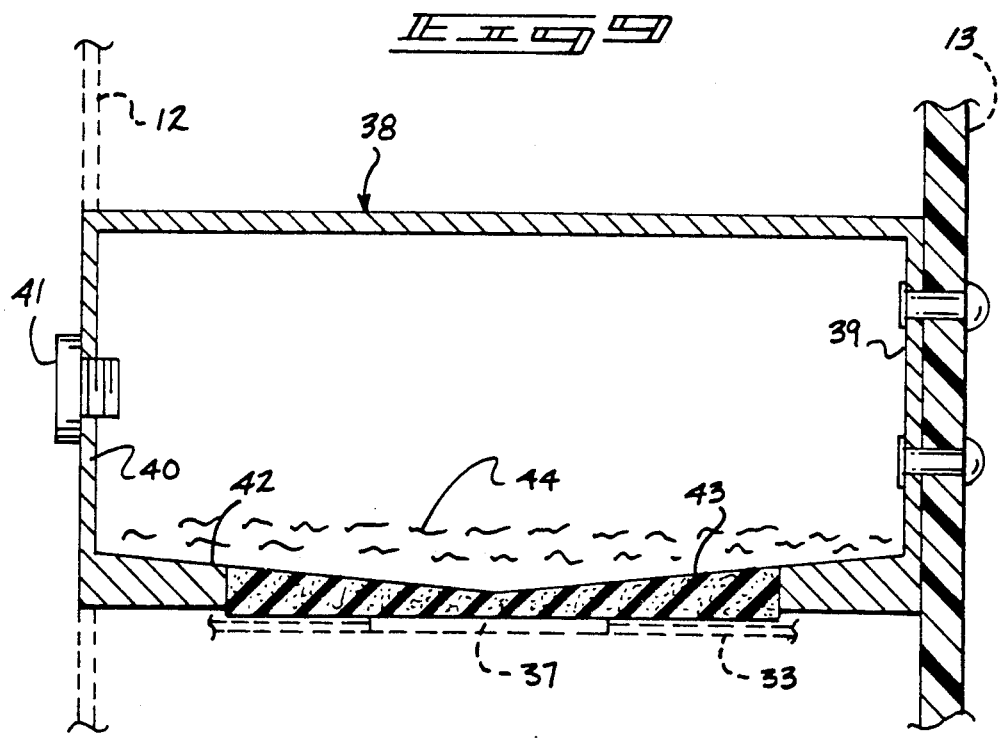
FIG. 9 is an orthographic view, taken along the lines 9—9 of FIG. 8 in the direction indicated by the arrows.

The holders 34 are further optionally arranged to include each holder base 35 mounting a slide member 37 directed through the holder base and through the conveyor belt 33, in a manner as indicated in FIG. 7. To this end, a fluid reservoir 38 is mounted within the conveyor 33 within the flights of the conveyor and secured by the reservoir first and second end walls 39 and 40 to the housing first and second end walls 12 and 13, wherein a reservoir fill cap 41 directed through the first end wall 12 permits filling of the reservoir with a cleaning fluid 44. The reservoir has a reservoir side wall extending at least coextensively with the conveyor belt 33, wherein a side wall sponge member 43 mounted to the side wall is in contiguous communication with the conveyor belt to effect contiguous communication with the holder base sponge members 37, in a manner as indicated in FIG. 9. In this manner, cleaning solution for the cassette tapes is imparted to the cassettes through the side wall sponge member 43 and the holder base sponge member 37.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cassette carousel apparatus, comprising, a housing, with the housing having a first end wall spaced from, parallel to, and coextensive with a second end wall, and a top wall spaced from and parallel to a bottom wall, and a plurality of arcuate side walls, the top wall having a top wall opening and a guide track positioned within the housing extending coextensively with the top wall opening, and at least one of the side walls, with a door slide structure mounted within the guide track and extending coextensively with the top wall opening in a first position, and displaced from the top wall opening in a second position received within the guide track along said at least one side wall, and the door slide structure having a plurality of adjacent parallel pivoted door slats, and the top wall opening having an opening first end spaced from an opening second end and conveyor means within the housing securing an endless array of cassette holders, and the top wall opening first end includes an illumination bulb mounted thereto, and a battery member and a switch member mounted within the housing in electrical communication with the illumination bulb to effect selective illumination of the illumination bulb to project illumination within the housing for illumination of the conveyor means, and the conveyor means includes a first roller and a second roller rotatably mounted in a parallel relationship between the first end wall and the second end wall, wherein the first roller and the second roller are arranged in a spaced relationship, having a continuous endless conveyor belt mounted about the first roller and the second roller, with the first roller having a first roller axle, and the first roller axle orthogonally and rotatably mounted through the first end wall and an axle handle mounted to the first roller axle for effecting selective rotation of the first roller axle and the second roller, and rotation of the endless conveyor belt, and the first roller and the second roller each include a matrix of projections mounted to an exterior surface of each of the first roller and the second roller for enhanced engagement with the conveyor belt, and the continuous array of cassette holders includes a plurality of individual holders, with each individual holder having a holder base, each holder base fixedly mounted to the conveyor belt, and the holder base having a plurality of spring-biased side walls, wherein the spring-biased side walls are arranged for receiving a cassette therebetween, and the holder base includes a holder base sponge member directed through the holder base and the conveyor belt, and a fluid reservoir, the conveyor belt having spaced parallel flights, and the fluid reservoir mounted between the flights, and the fluid reservoir having a reservoir first end wall mounted to the housing first end wall, and the reservoir having a reservoir second end wall mounted to the housing second end wall, with a fill cap directed through the first end wall of the reservoir into fluid communication with the reservoir to effect selective filling of the reservoir, and the reservoir having a reservoir side wall, the reservoir side wall having a side wall sponge, and the side wall sponge arranged in contiguous communication with the conveyor belt for cleaning fluid from the reservoir through the holder base sponge member and the side wall sponge to direct the cleaning fluid within each of said cassette holders.

* * * * *